UNITED STATES PATENT OFFICE.

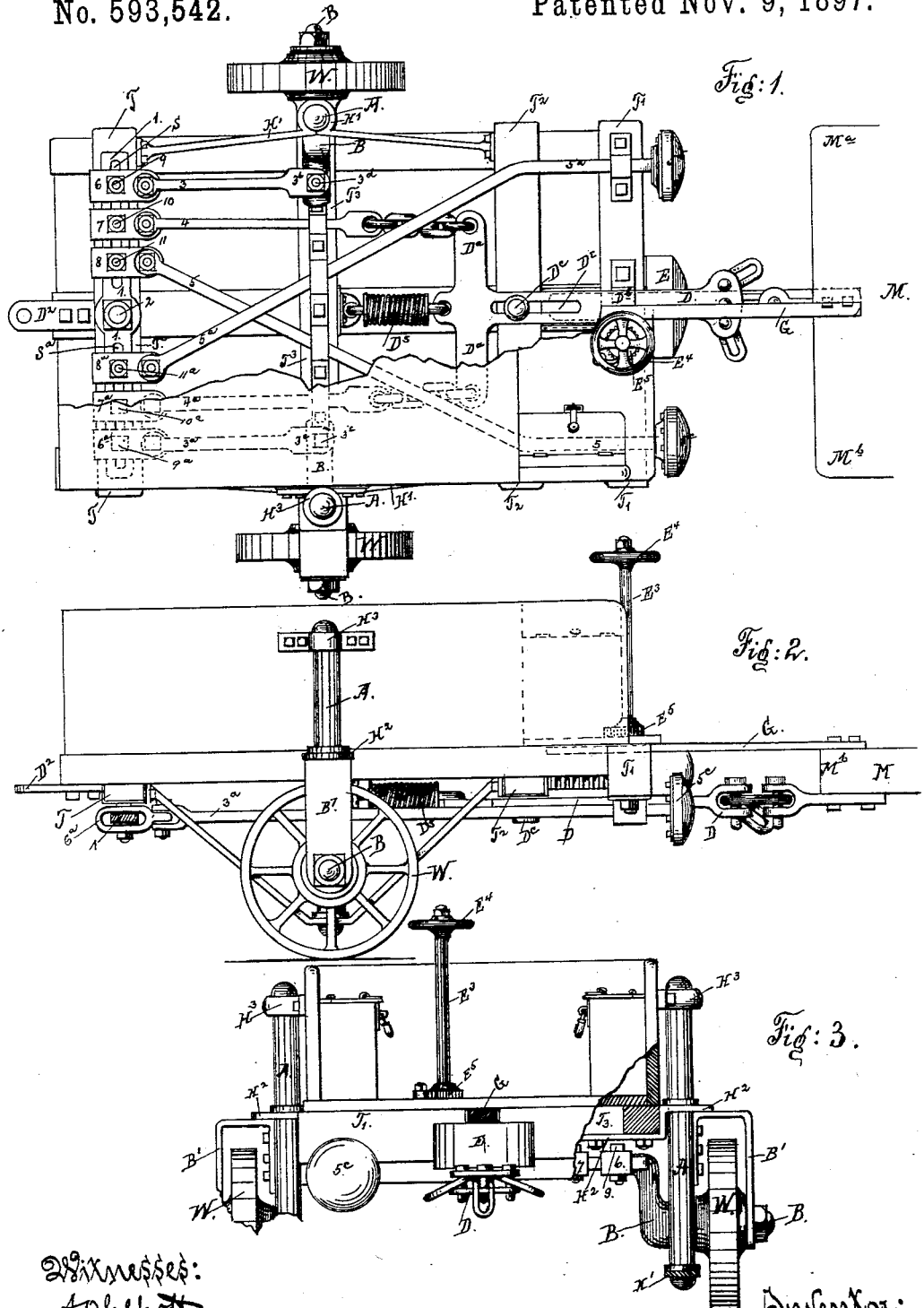

OSCAR OLSON, OF GERVAIS, OREGON.

AUTOMATIC VEHICLE-STEERING DEVICE.

SPECIFICATION forming part of Letters Patent No. 593,542, dated November 9, 1897.

Application filed July 15, 1896. Serial No. 599,314. (No model.)

*To all whom it may concern:*

Be it known that I, OSCAR OLSON, a citizen of the United States, residing at Gervais, in the county of Marion, State of Oregon, have invented a certain new and useful Improvement in Automatic Vehicle-Steering, of which the following is a specification, reference being had to the accompanying drawings.

The invention relates to an automatic steering device for vehicles, and has for its object the facilitation of the handling of heavy vehicles, such as water-tanks attached to traction-engines.

To this end I have constructed a combination of lever arms or bars connecting two side buffers and the draw-bar by means of lever-arms to a general bar pivoted under the bottom of the rear end of the vehicle, which bar in turn is attached to the bracket-axles supporting the ground-wheels, and thus steering the vehicle automatically when the propelling-engine changes its course. I attain these objects by the mechanism illustrated in the accompanying drawings, in which—

Figure 1 is a view showing the bottom and top part of a tank with my automatic steering device attached. Fig. 2 is a side elevation of the tank. Fig. 3 is an end view showing the supporting-wheels on the bracket-axles pivoted to the sides of a vehicle.

In carrying out the invention the two supporting-wheels W are firmly secured to the bracket-axles B, which are hung to the sides of the vehicle by the pivoted side standards A, turning in hangers $H^2$ $H^3$ and braces $H'$. The supporting-wheels W are journaled on the outer ends of bracket-axles B and through the arched hangers $B'$, as shown in Fig. 3 of the drawings. To force these bracket-axles B, with the ground-wheels W, to move in the proper direction, a bar 1, made of steel or iron, is pivotally hung by a strong pivot 2 under the bottom and near the rear end of the vehicle to a cross-timber T. To this pivoted bar 1 the lever-arms 3, $3^a$, 4, $4^a$, 5, and $5^a$ are hinged by adjustable clamps 6, $6^a$, 7, $7^a$, 8, and $8^a$ and can be adjusted as to the space between them by the clamp set-screws 9, $9^a$, 10, $10^a$, 11, and $11^a$, which can be moved in the slots S and $S^a$.

To the ends of the lever-arms 5 and $5^a$, which extend to a proper distance beyond the end timbers $T'$ of the vehicle, the side buffers $5^b$ and $5^c$ are secured. To the draw-bar D, which is provided with the cross-piece $D^a$, the lever-arms 4 and $4^a$ are chained, whereas the jaws $3^b$ and $3^c$ of the lever-arms 3 and $3^a$ are pivoted to the bracket-axles B at $3^d$ and $3^e$. The draw-bar D, hung under the front-end timber $T'$ by hanger $D^b$, is also secured to the cross-timber $T^2$ by bolt $D^c$, which is passed through slot $D^e$ of draw-bar D, wherein said draw-bar can easily turn to either side and slide forward and backward, as the case may be. To compel the draw-bar D to come always back to its original position, the draw-bar is provided with a strong spring $D^s$, which is firmly secured thereto and to the cross-timber $T^3$. The slot $D^e$ is made just long enough to allow the draw-bar D to be pulled out against the bolt $D^c$, so as to prevent the spring $D^s$ from breaking.

Draw-bar D is coupled to a motor or traction-engine M in the ordinary manner, and as it may be necessary at times to prevent the ends $M^a$ and $M^b$ of engine M from coming in contact with buffers $5^b$ and $5^c$ the middle bumper-block E is made so as to be moved forward. For this purpose one edge of the bumper-stem $E'$ of bumper E is provided with cams $E^2$, which are connected with and fed by a spur-wheel on shaft $E^3$, which again can be rotated by the hand-wheel $E^4$ and can be kept stationary by an ordinary ratchet and dog at $E^5$.

In operation when a tank provided with my invention is attached to a traction-engine the supporting-wheels W will always be forced to move in the same direction taken by the engine, as should any of the ends $M^a$ or $M^b$ of the engine M touch either of the side buffers $5^b$ or $5^c$ the one touched will push the lever-bar 1 backward, and thus through the pushing and pulling of the lever-arms 3 and $3^a$ the bracket-axles B, with the ground-wheels W, are turned in the desired direction. Under ordinary circumstances when the tank is pulled by the draw-bar D turning and sliding in slot $D^e$ around bolt $D^c$ the wheels W are turned, as described before, by the lever-arms 4 and $4^a$ pulling lever-bar 1, which again pushes and pulls lever-arms 3 and $3^a$, with the result before mentioned. Thus the slightest variation of the course taken by the engine M will be automatically transmitted to the wheels W of the vehicle. To prevent the tank from bearing entirely on the draw-bar D when coupled to the engine, a guide-bar G, which is bolted to the platform M of the traction-engine, is let, above the bumper E, into and through end timber T' a sufficient length. The tank is provided at its rear end also with a coupling or draw bar D², so that another vehicle may be coupled thereto. The front platform of the tank can also be arranged, as shown, to have on its sides lock-boxes for the storage of tools and oils.

I am aware that prior to my invention steering devices for vehicles have been made. I therefore do not claim such an invention broadly; but What I do claim as my invention, and desire to secure by Letters Patent, is—

1. In an automatic vehicle-steering device the combination with the framework, of the two side buffers connected by means of lever-arms and connections to the bracket-axles of the supporting ground-wheels, substantially as described.

2. An automatic vehicle-steering device having the sliding draw-bar with its cross-piece whereto the lever-arms are chained, which lever-arms are clamped onto the general lever-bar 1, which again connects with the bracket-axles of the ground-wheels, substantially as set forth.

3. The combination in an automatic vehicle-steering device of the bracket-axles supporting the ground-wheels, which are journaled onto said bracket-axles, the upright standards A pivoted to the sides of the vehicle and the arched hangers and braces, securing the pivoted standards to the frame of the vehicle or tank, all for the purpose set forth and specified.

4. The combination in an automatic vehicle-steering device of the sliding draw-bar, the side buffers connected with the general lever-bar at the rear end of the vehicle, the lever-bar 1 having the slots for the set-screws, fastening the clamps of the lever-arms, to pass in, and the lever-arms connecting the bracket-axles with the lever-bars, all substantially as specified.

5. The combination in an automatic vehicle-steering device of the sliding draw-bar having a slot, and moving on a stationary bolt, the spring at the end of the draw-bar, the cross-piece of the draw-bar having lever-arms chained to its ends, and the guide-bar supporting the tank and being connected with the platform of the traction-engine all substantially as set forth.

6. The combination in an automatic vehicle-steering device of the movable middle bumper having one edge provided with cams and the standard-staff having the hand and spur wheel connected with said cams to move the bumper forward and backward, all substantially as set forth and for the purpose specified.

In testimony whereof I affix my signature, in the presence of two witnesses, this 16th day of June, 1896.

OSCAR OLSON.

Witnesses:
A. OHLHOFF,
J. S. STOTT.